HIGHWAY VEHICLE REPORTING SYSTEM

Filed Sept. 12, 1958 11 Sheets-Sheet 1

INVENTOR.
S. W. FREEMAN
BY Forest B. Hitchcock
HIS ATTORNEY

INVENTOR.
BY S. W. FREEMAN
Forest B. Hitchcock
HIS ATTORNEY

April 26, 1966 S. W. FREEMAN 3,248,521

HIGHWAY VEHICLE REPORTING SYSTEM

Filed Sept. 12, 1958 11 Sheets-Sheet 3

INVENTOR.

S.W. FREEMAN

BY Forest B. Hitchcock

HIS ATTORNEY

April 26, 1966 S. W. FREEMAN 3,248,521

HIGHWAY VEHICLE REPORTING SYSTEM

Filed Sept. 12, 1958 11 Sheets-Sheet 4

FIG. 5.

| CODE NO. | CONVENTIONAL BINARY CODE | | | | TAPE CODE NO. |
|---|---|---|---|---|---|
| 1 | + | + | + | + | 1 |
| 2 | + | + | + | — | 2 |
| 3 | + | + | — | + | 9 |
| 4 | + | + | — | — | 3 |
| 5 | + | — | + | + | |
| 6 | + | — | + | — | 0 |
| 7 | + | — | — | + | |
| 8 | + | — | — | — | 4 |
| 9 | — | + | + | + | |
| 10 | — | + | + | — | 8 |
| 11 | — | + | — | + | |
| 12 | — | + | — | — | |
| 13 | — | — | + | + | 7 |
| 14 | — | — | + | — | |
| 15 | — | — | — | + | 6 |
| 16 | — | — | — | — | 5 |

FIG. 6.

ARRANGEMENT OF DISCS ON TAPE

+ + + + − − − − + + − + −

+ = DISK

— = NO. DISK

INVENTOR.

S. W. FREEMAN

BY Forest B. Hitchcock

HIS ATTORNEY

HIGHWAY VEHICLE REPORTING SYSTEM

Filed Sept. 12, 1958

INVENTOR.
S. W. FREEMAN

BY Forest B. Hitchcock

HIS ATTORNEY

FIELD DETECTOR-AMPLIFIER

INVENTOR.
S. W. FREEMAN
BY Forest B. Hitchcock
HIS ATTORNEY

HIGHWAY VEHICLE REPORTING SYSTEM

Filed Sept. 12, 1958

INVENTOR.
S. W. FREEMAN
BY Forest B. Hitchcock
HIS ATTORNEY

INVENTOR.
S. W. FREEMAN
BY *Forest B. Hitchcock*
HIS ATTORNEY

April 26, 1966 S. W. FREEMAN 3,248,521

HIGHWAY VEHICLE REPORTING SYSTEM

Filed Sept. 12, 1958 11 Sheets-Sheet 9

OSCILISCOPE WAVE FORMS IN AMPLIFIER CIRCUITS

INDICATOR CAM ARRANGEMENT

INVENTOR.
S. W. FREEMAN
BY Forest B. Hitchcock
HIS ATTORNEY

FIG. 11.

CODE CONVERSION TABLE

| DIGITS (UNITS OR TENS) | CODE STORAGE RELAYS | | | | INDICATION CONTROL RELAYS | | | |
|---|---|---|---|---|---|---|---|---|
| | US1 TS1 | US2 TS2 | US3 TS3 | US4 TS4 | U1 T1 | U2 T2 | U3 T3 | U4 T4 |
| 1 | + | + | + | + | E | E | ---- | ---- |
| 2 | + | + | + | — | E | ---- | E | ---- |
| 3 | + | + | — | — | E | ---- | ---- | E |
| 4 | + | — | — | — | ---- | E | E | ---- |
| 5 | — | — | — | — | ---- | E | ---- | E |
| 6 | — | — | — | + | ---- | ---- | E | E |
| 7 | — | — | + | + | E | E | E | ---- |
| 8 | — | + | + | — | E | E | ---- | E |
| 9 | + | + | — | + | E | ---- | E | E |
| 0 | + | — | + | — | ---- | E | E | E |

FIG. 11A.

+ = RELAY US OR TS UP

— = RELAY US OR TS DOWN

E = RELAY U OR T UP

---- = RELAY U OR T DOWN

INVENTOR.
S. W. FREEMAN.
BY Forest B. Hitchcock
HIS ATTORNEY

April 26, 1966 S. W. FREEMAN 3,248,521
HIGHWAY VEHICLE REPORTING SYSTEM
Filed Sept. 12, 1958 11 Sheets-Sheet 11

INVENTOR.
S. W. FREEMAN
BY
Forest B. Hitchcock
HIS ATTORNEY

United States Patent Office 3,248,521

Patented Apr. 26, 1966

3,248,521

HIGHWAY VEHICLE REPORTING SYSTEM

Sydney W. Freeman, Rochester, N.Y., assignor to General Signal Corporation

Filed Sept. 12, 1958, Ser. No. 760,790
14 Claims. (Cl. 235—61.11)

This invention relates to systems for reporting traffic information, and more particularly relates to a system of reporting highway bus traffic information to a central office.

For effective simultaneous operation of many independent vehicles over given routes and according to predetermined schedules, it is often desirable and necessary to have a relatively constant check on the progress of each of the vehicles involved. Presently, bus companies generally employ mobile dispatchers who drive radio equipped cars and keep a rough check on the operation of the system by roving the field and reporting major departures from schedule to a central dispatcher via radio. While this roving "spot-check" system is fairly effective for some purposes, it does not give a complete picture of the field situation nor does it satisfy the need for maintaining direct surveillance of individual drivers to enforce their strict adherence to published schedules. Since departures from schedule not only cause considerable inconvenience to passengers but often lead to serious overloading of some buses while others on the same route have relatively few passengers, there is a definite need for a system that will provide automatic surveillance of bus performance.

To meet this problem, the traffic control system disclosed herein proposes that each bus carry a simple device capable of transmitting an identifying signal which can be received at various reporting points along its predetermined route. The bus-identification signal is then transmitted from the reporting point to a central traffic control office where it is displayed upon a panel at a location corresponding to the location of the reporting point in the field. Upon the receipt of each bus-identification signal by the central traffic control office, a permanent record is made registering the bus-identification number, the reporting point at which it was received, and the time the signal was received. This proposed system would thus furnish the central office with a continuous flow of information revealing the minute-by-minute status of the entire bus system, and at the same time would create a permanent record to monitor the performance of each individual bus.

The traffic information system disclosed herein deals particularly with the operation of passenger buses; but, it is to be understood that the invention may be utilized in connection with the operation of any type of vehicle.

A principal object of the invention is to provide a system in which a central traffic-control office is presented with a continuous flow of information concerning the progress of highway vehicles operating along predetermined routes, without necessitating the use of extra personnel in the field as checkers, and without interruptions of the normal operation of the vehicles involved.

Another object of the invention is to present in a central traffic-control office a transient visual reproduction of the continuous progress of particular vehicular traffic along predetermined routes.

Another object of the invention is to provide a written record of the time a particular vehicle passes a predetermined reporting point without necessitating the use of extra personnel in the field as checkers and without interruption of the normal operation of the vehicle involved.

Another object of this invention is to utilize radioactive materials for the production of identifying signals, whereby it is possible electronically to identify and record the passing of a particular vehicle by a predetermined field check point without necessitating the use of electronic apparatus on the vehicle involved.

Another object of this invention is to provide a coded traffic information system in which the vehicles involved induce coded pulses in receivers located at wayside reporting points, the induced pulses being then transmitted to a central office, decoded, and converted into characteristic vehicle identification numbers.

Another object of this invention is to provide a coded traffic information system in which the vehicles involved are equipped with influencing elements arranged in characteristic combinations according to identification code patterns for purposes of inducing identifying coded signals in receivers located at wayside reporting points.

Another object of this invention is to provide a traffic information code system whereby vehicles within the system induce coded signals in receivers located at wayside reporting points, the said signals being induced and then transmitted to a central office at speeds varying with and directly proportional to the speed of the said vehicle as it passes the said wayside reporting point.

Another object of this invention is to provide a coded traffic information system in which coded signals can be received at varying rates, stored, and later decoded in such a way that the decoded intelligence is unaffected by the varying rates of reception.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts through the several views, and in which:

FIG. 5 is a conventional binary code table showing the derivation of the bus top code combination;

FIG. 6 illustrates the arrangement of code discs on each movable bus top tape as based upon the conventional binary code illustrated in FIG. 5;

Figure 9A:
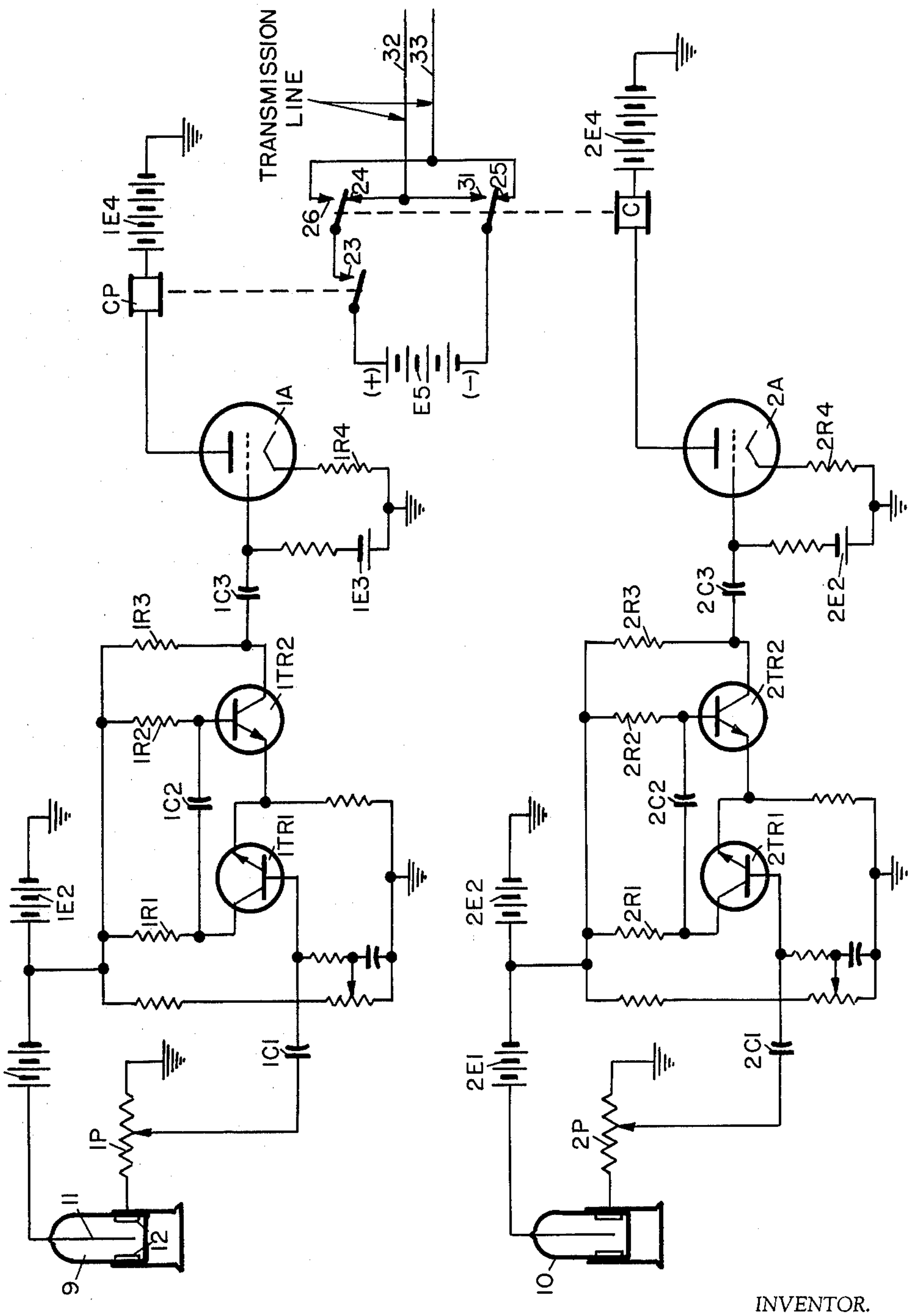
Figure 9B:
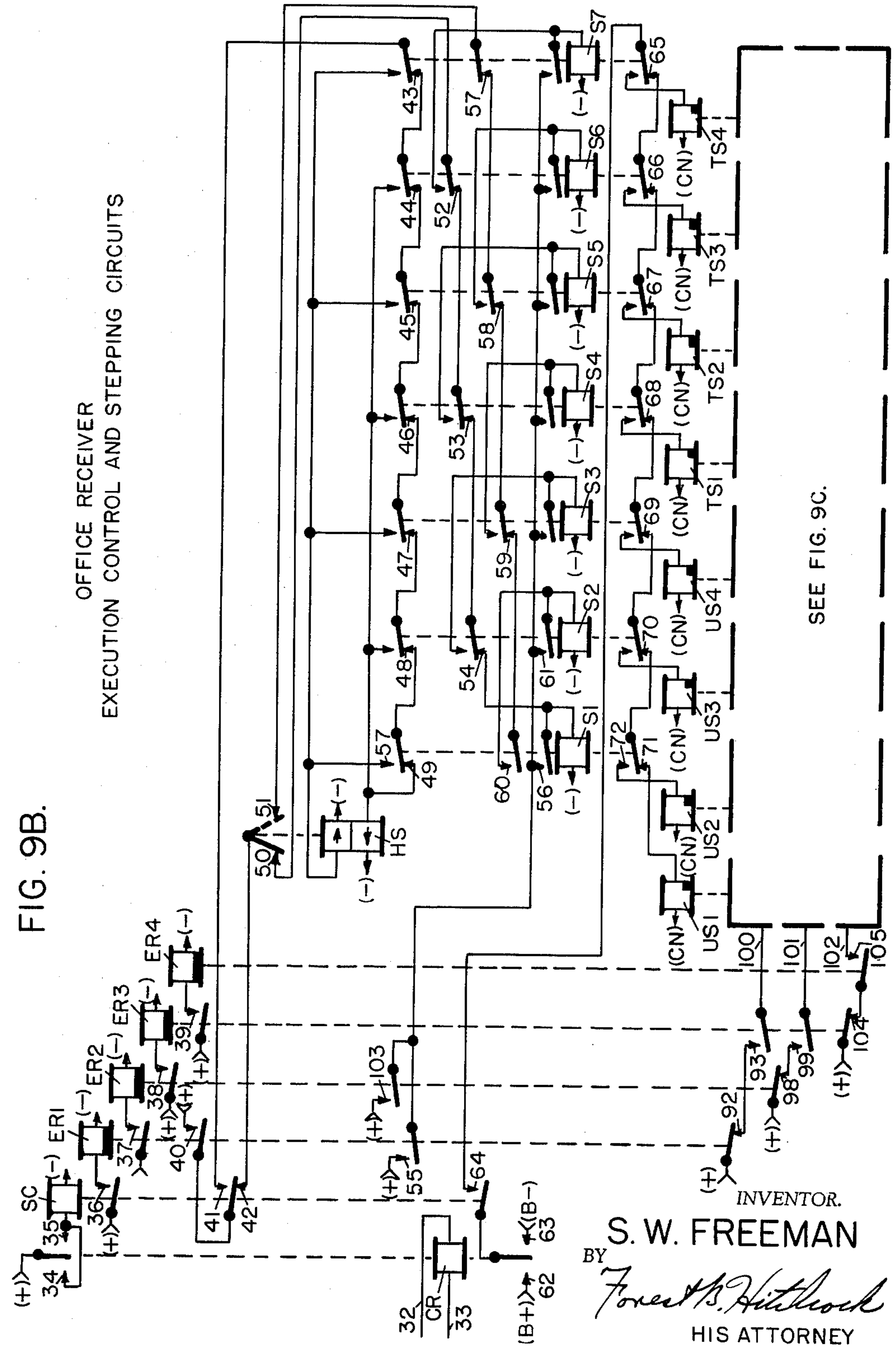
Figure 9C:
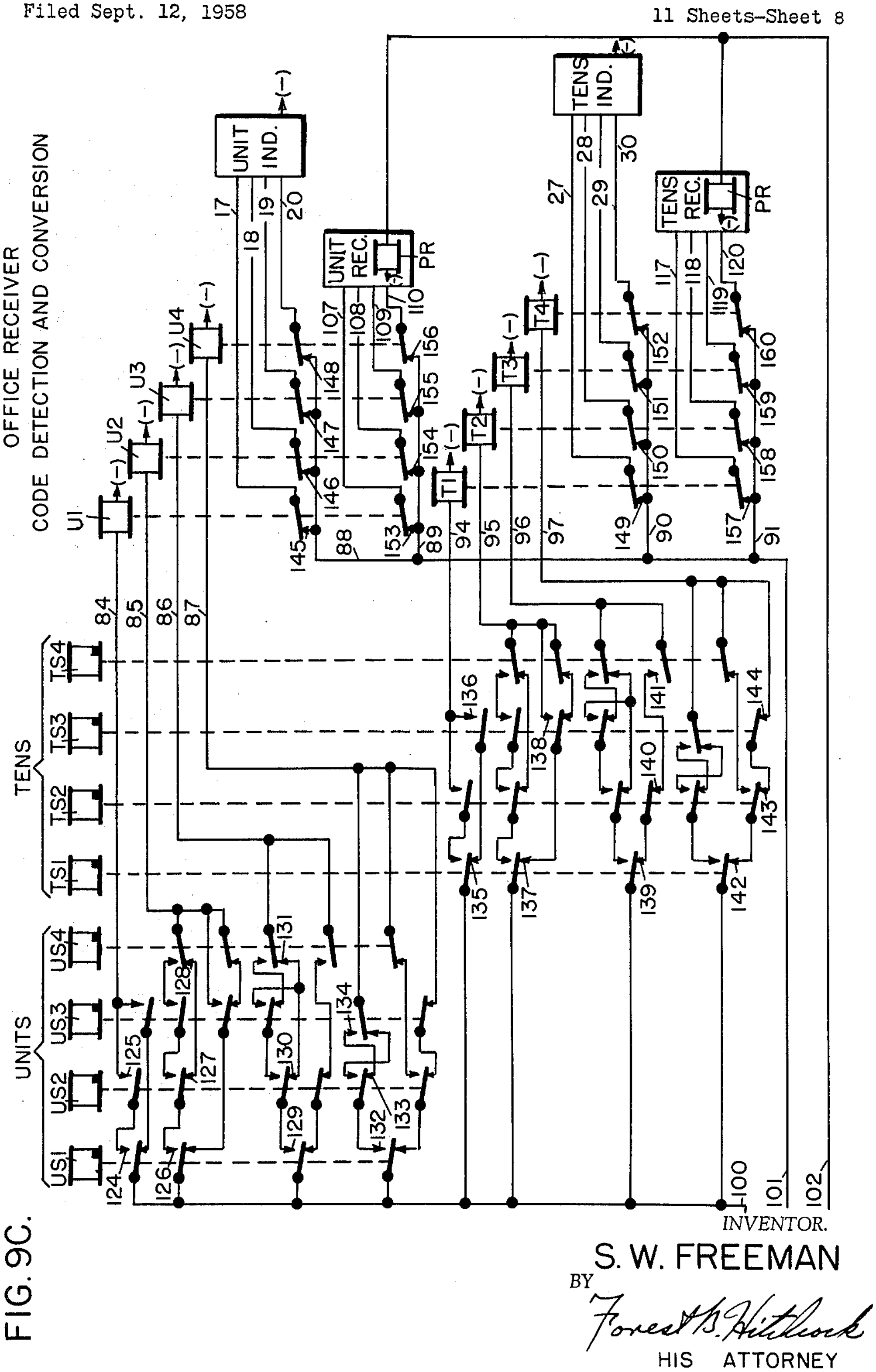
Figure 12A:
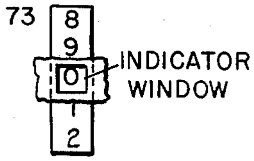
Figure 10:
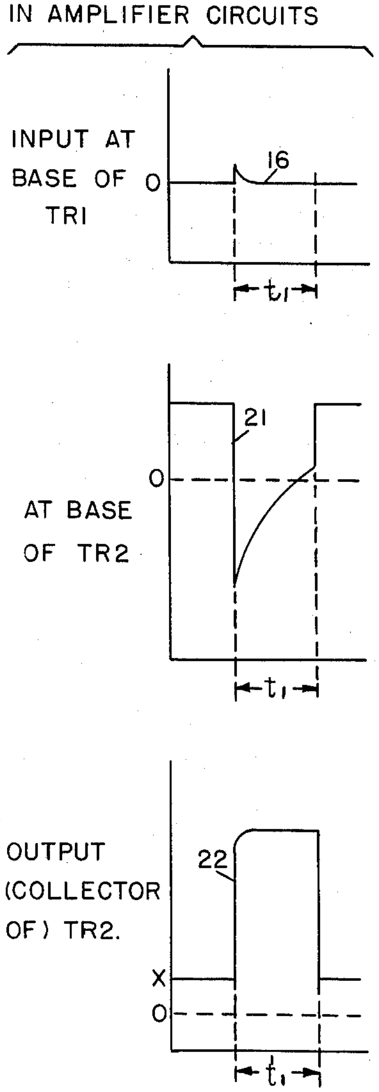
Figure 12:
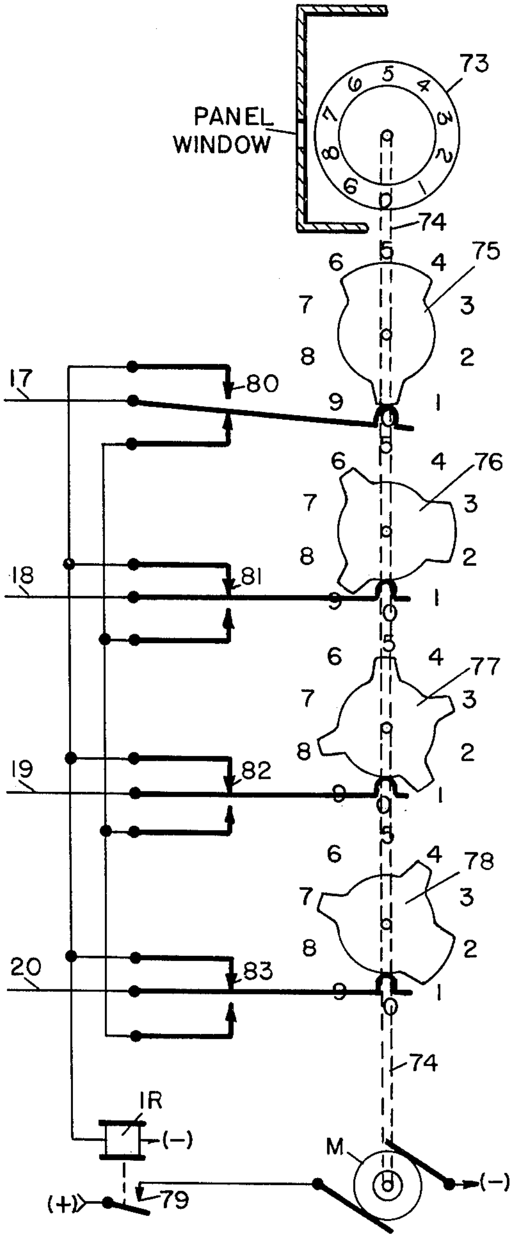
Figure 13:
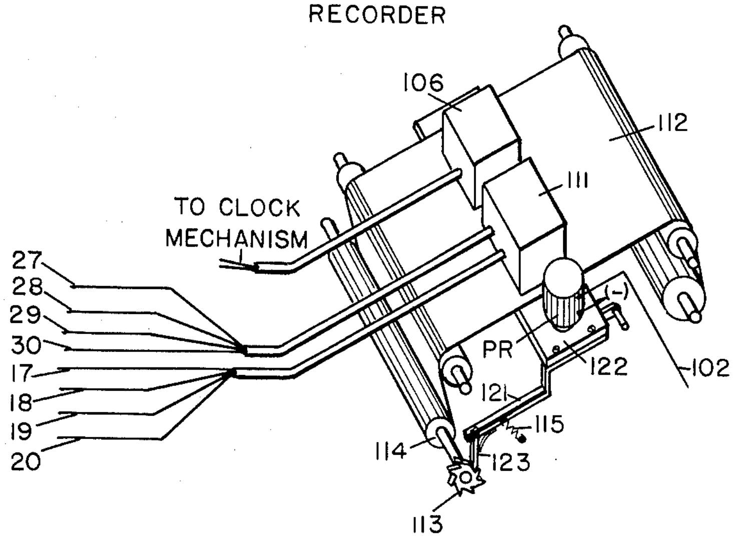
Figure 14:
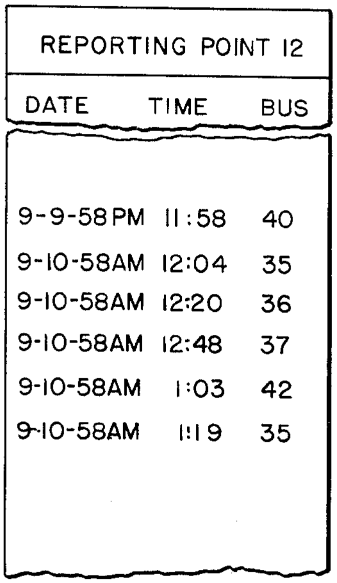

FIGS. 9A, 9B and 9C comprise a detailed schematic of the circuit, FIG. 9A illustrating the field unit comprised of detector, amplifier and pulse conversion circuits, FIG. 9B illustrating execution control and stepping circuits of the central office unit, and FIG. 9C illustrating the code detector and conversion circuits of the central office unit;

FIG. 10 illustrates oscilloscope wave forms used in analyzing the "one-shot" multivibrator circuit utilized for amplification in conjunction with the detector units;

FIGS. 11 and 11A constitute the Code Conversion Table indicating the relative positions of circuit relays necessary to the proper operation of the vehicle identification indicator and printing wheels;

FIGS. 12 and 12A illustrate schematically the basic wheel unit, the cam arrangement, and the circuit utilized in positioning the vehicle numbers on visual indicators and recording device printing wheels;

FIG. 13 represents a recording unit for printing a permanent traffic information record; and FIG. 14 illustrates a typical permanent record made by the recording unit illustrated in FIG. 13.

For the purpose of simplifying the illustration and facilitating in the explanation, the various parts of the circuits constituting the embodiment of the invention have been shown diagrammatically and certain conventional illustrations have been employed, the drawings having been made more with the purpose of making it easy to understand the principles and mode of operation than with the idea of illustrating the specific construction and arrangements of parts that would be employed in practice. Thus, the various relays and their contacts are illustrated in a conventional manner, and symbols are used to indicate connections to the terminal of batteries, or other sources of electric current, instead of showing all of the wiring connections to these terminals. The symbols (+) and (−) are employed to indicate the positive and negative terminals respectively of suitable batteries, or other sources of direct current; and the circuits with which these symbols are used always have current flowing in the same direction. The symbols (B+) and (B−) indicate connections to the opposite terminals of a suitable battery, or other direct current source, which has a central or intermediate tap designated (CN); and the circuits with which these symbols are used, may have current flowing in one direction or the other depending upon the particular terminal used in combination with the intermediate tap (CN).

Each bus operated in a traffic control system in accordance with this invention is equipped with a plurality of influencing elements which are arrangeable in characteristic combinations. For purposes of this disclosure radioactive discs are utilized as the influencing elements. Referring to FIGS. 1, 2, 3 and 4, each bus 1 has a lead shielded box unit 8 attached to its top. The design of this bus top unit 8 permits groups of radioactive discs to radiate alpha and beta particles and gamma rays in an upward direction through two windows in its otherwise shielded cover (see FIG. 2). The radioactive discs are arranged in two parallel lines. In one of the said lines two identical groups of stepping control discs 2 are regularly spaced and sequentially attached to fixed tapes 4, and, in the other said line, two identical groups of code discs 3 are correspondingly but intermittently attached to two movable tapes 5 in characteristic combinations according to an identification code pattern.

The movable tapes 5 are positioned through gear mechanisms 6 by cranks 7 (only one shown) which simultaneously set up the digits of an assigned bus number in the window 15 at the front of the bus. The code discs 3 are arranged on the movable tapes 5 in the pattern illustrated in FIG. 6. This pattern has been derived from a conventional four-place binary code table (FIG. 5). The tape code numbers as shown in the right-hand column of FIG. 5 were chosen so that when each consecutive set of binaries is moved only one place to the left, the binary for the next consecutive tape code number will appear. Thus, by arranging the code discs 3 on the movable tapes 5 in the manner as shown in FIG. 6, as the bus driver cranks his assigned bus number into position in the front window 15 of the bus, the movable tapes 5 are positioned by the gear mechanism 6 so that the code disc pattern in the rear window of the bus top unit 8 corresponds to the "tens" digit of the assigned bus number, and the code disc pattern appearing in the front window of the bus top unit 8 corresponds to the "units" digit. It should be noted that the position of the code discs is such that each code disc 3 is slightly forward of its corresponding stepping code disc 2. This has been done for reasons that will be apparent as the disclosure proceeds. The code patterns illustrated in FIGS. 2 and 3 correspond to the arbitrary assigned bus number "70."

Figure 1:
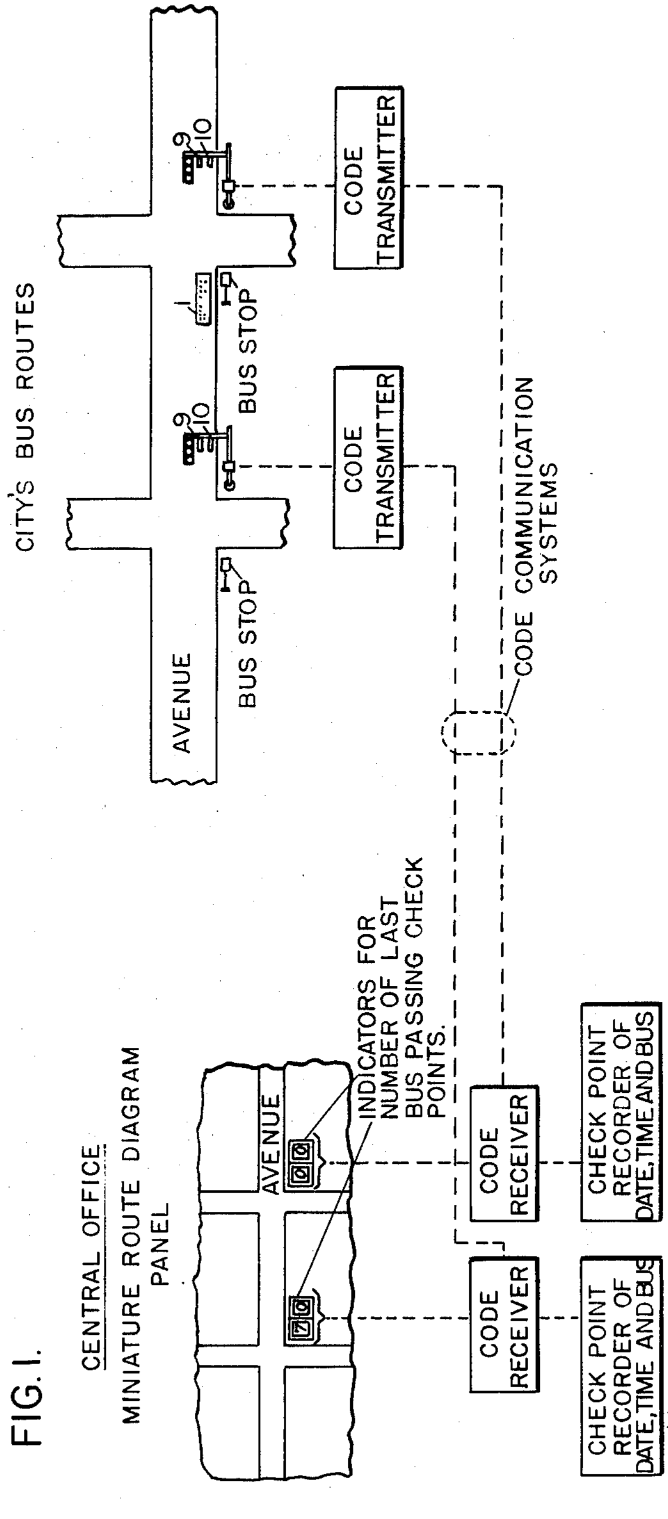
FIG. 1 is a simplified block diagram of the entire traffic information system showing the general location of the wayside reporting points, the code transmitters and receivers, and also showing the nature of the display panel at the central office.
Figure 2:
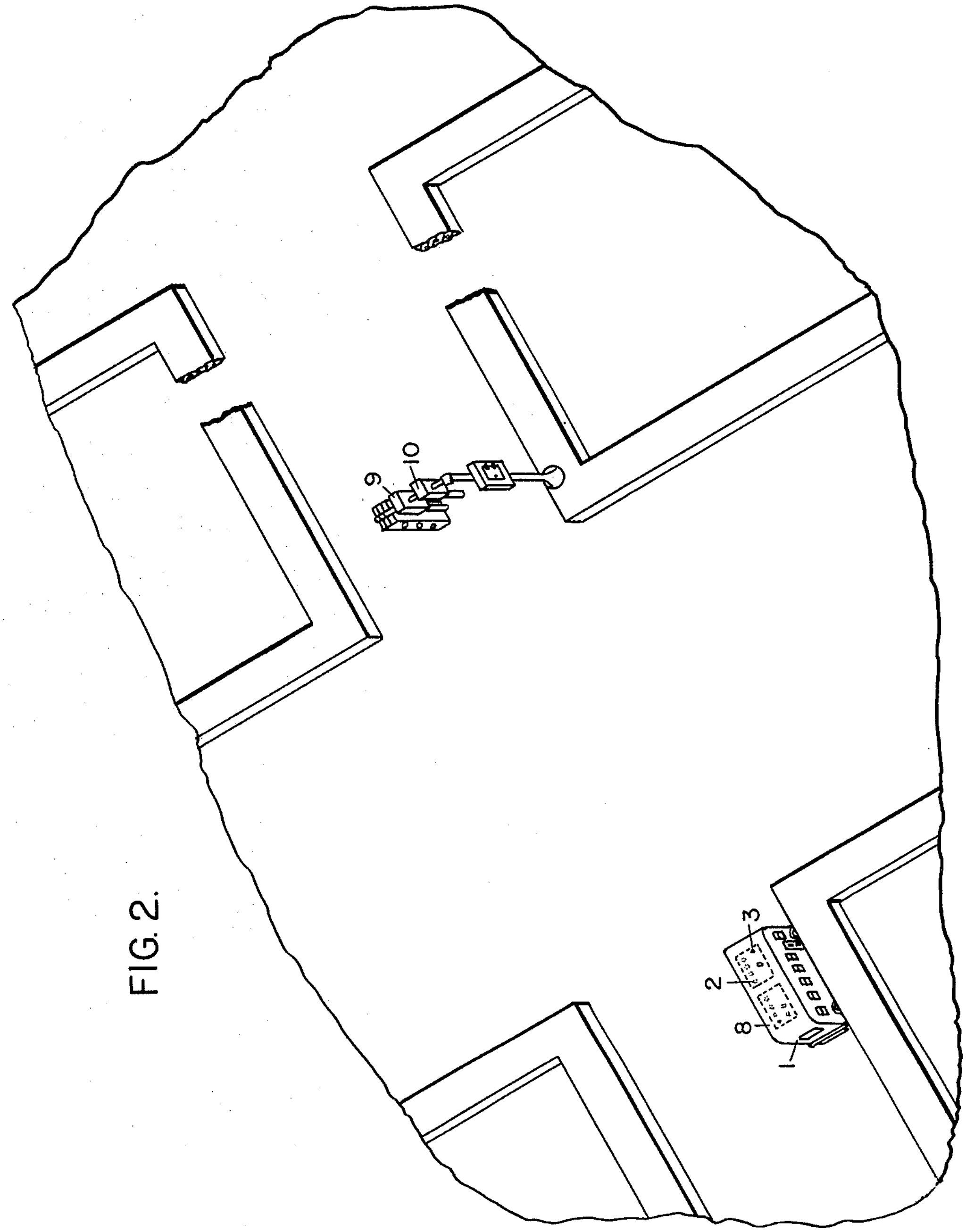
FIG. 2 represents a bus in the field and illustrates a typical reporting point showing the mounting of detector units on an already existing traffic light standard.
Figure 3:
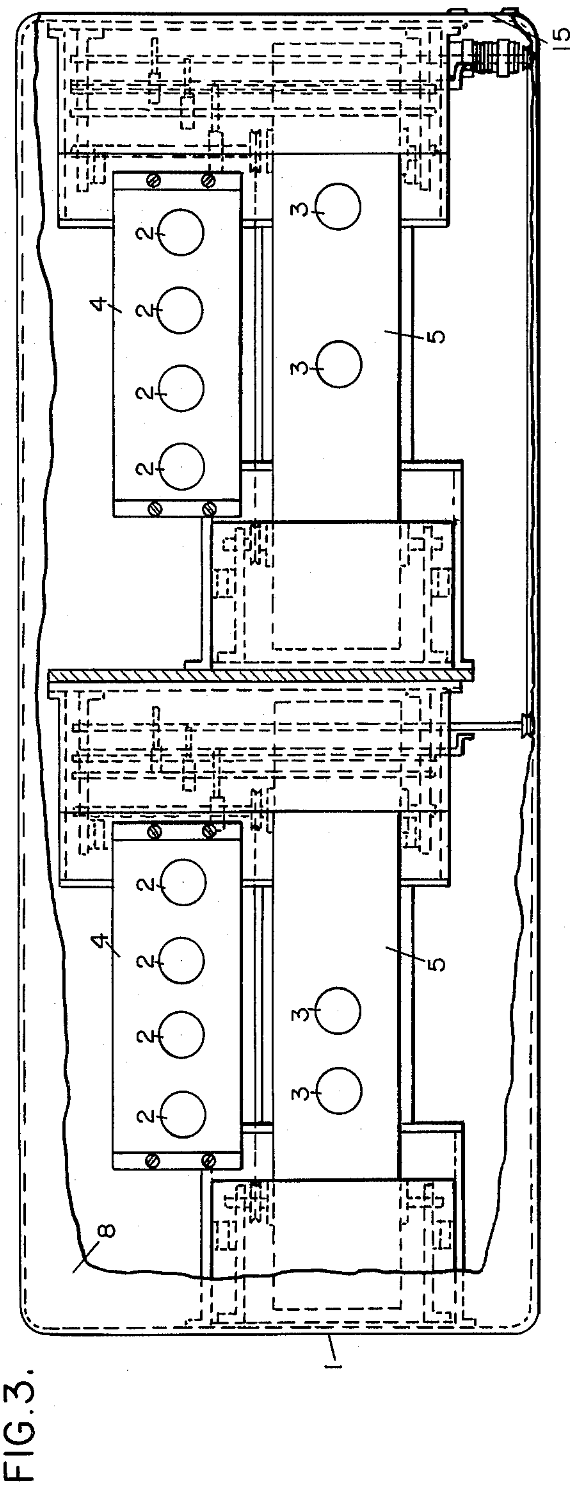
FIGS. 3 and 4 are detailed representations of bus top units showing the arrangement of the radioactive discs and the apparatus for varying the bus top code patterns.
Figure 4:
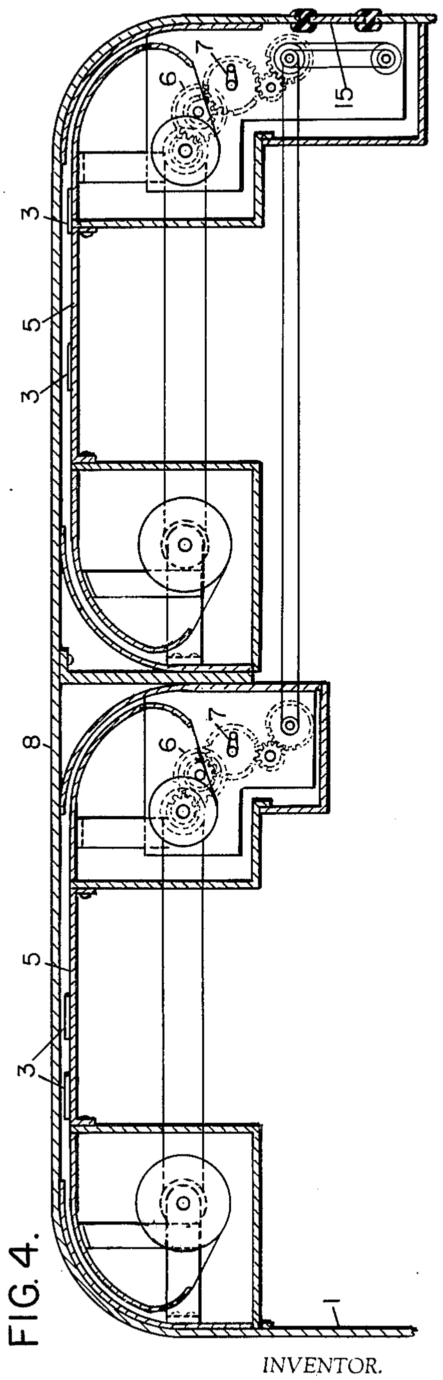
Figure 7:
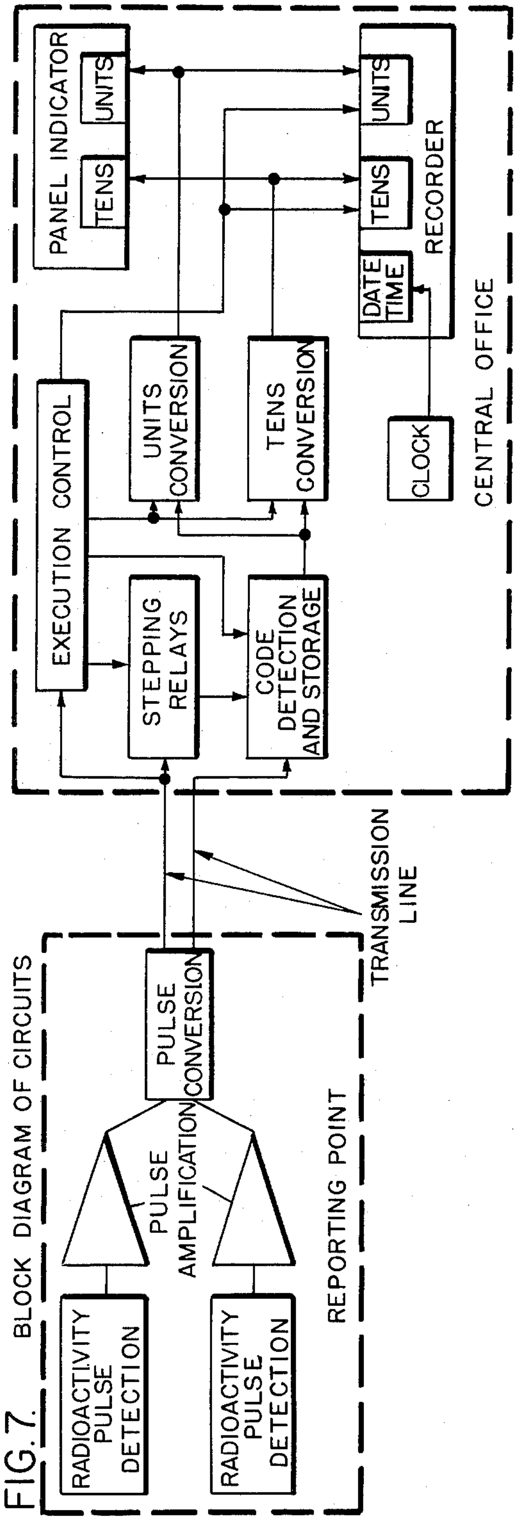
FIG. 7 is a block diagram of the electrical circuits utilized in this disclosure showing the basic elements of both the wayside reporting point units and the central office unit.

Along the route followed by the bus, receiving units are set up at reporting points consisting, in part, of two detector units 9 and 10 mounted in tandem above the bus route in such a way that when the bus is driven under each reporting point at a given distance from the curb, the stepping control discs 2 will pass under one detector 9, and the code discs 3 will pass under the other detector 10. FIG. 2 shows such a reporting point mounted on an already existing traffic light standard.

Figure 8B:
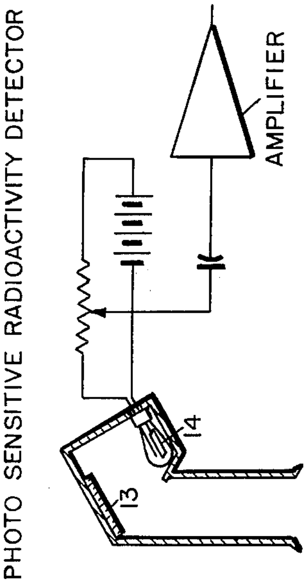
FIGS. 8A and 8B are representations of radio activity detector units, FIG. 8A illustrating a Geiger counter detector, and FIG. 8B illustrating a photosensitive detector adapted from the Spinthariscope.
Figure 8A:
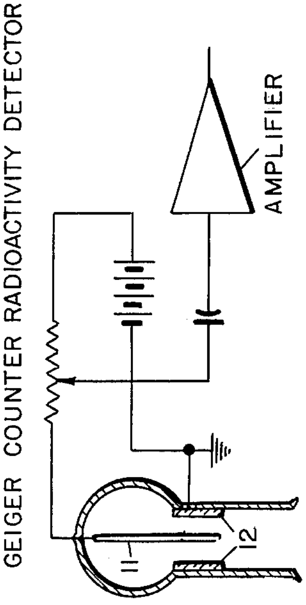

These detectors can be any device capable of creating a pulse of current in response to the passage of the particular type of influencing element attached to the bus. Since radioactive discs are the influencing elements chosen for purposes of this disclosure, detectors 9 and 10 can be any device capable of converting radioactive energy into electrical energy. Two different types of radioactivity detectors are illustrated in FIGS. 8A and 8B, both being based upon well-known radioactivity detection methods. FIG. 8A is based upon the Geiger counter which consists basically of two parallel electrodes 11 and 12 carrying opposite electrical charges. Radioactive particles, upon passing between the electrodes, will be attracted to one electrode or the other, or will produce ions that will be attracted to one electrode or the other. This creates an electrical impulse in the electrode circuit which can be utilized as a pulse.

FIG. 8B represents an adaptation of the Spinthariscope. When radioactive particles strike the zinc sulfide screen 13 a flash of light is created on the screen which causes a photoelectric cell 14 to conduct momentarily, creating a pulse of current in the photoelectric cell circuit.

Referring now to FIG. 9A, when the bus passes under a reporting point, radioactive particles emitted by the stepping control discs 2 and the code discs 3 enter radioactivity detectors 9 and 10 respectively. As each successive radioactive disc passes beneath its respective radioactivity detector, pulses of current are created in the detector circuits comprised respectively of potentiometers 1P and 2P, radioactivity detectors 9 and 10, and batteries 1E1, 1E2, and 2E1, 2E2. The pulses of current created in the detector circuits by the passing of the radioactive discs are fed through capacitors 1C1 and 2C1 as input into "one-shot" multivibrator circuits employing junction transistors 1TR1, 1TR2 and 2TR1, 2TR2.

These multivibrator circuits are designed so that without external excitation 1TR1 and 2TR1 are normally cut off, while 1TR2 and 2TR2 are normally conducting. FIG. 10 illustrates, by use of oscilloscope wave forms, the amplification features of these multivibrator circuits. A positive pulse 16 fed into the bases of 1TR1 and 2TR1 causes these transistors to conduct, allowing current to flow through resistors 1R1 and 2R1 which are coupled to the bases of 1TR2 and 2TR2 through capacitors 1C2 and 2C2. The voltage drop resulting from this surge of current through 1R1 and 2R1, drives the bases of 1TR2 and 2TR2 negative, cutting off these transistors until such time as the charges on 1C2 and 2C2 leak off through resistors 1R2 and 2R2 sufficiently to allow 1TR2 and 2TR2 to amplify once again (note wave form 21).

During the period of time in which 1TR2 and 2TR2 are cut off, the normal voltage drops present across collector resistors 1R3 and 2R3 are lost, creating square wave outputs 22 of high positive potential, which are coupled to the grids of triodes 1A and 2A through capacitors 1C3 and 2C3.

Tubes 1A and 2A are normally biased to cut off by batteries 1E3 and 2E3, and conducts only when their grids are driven positive in response to amplified pulses created in the detector circuits by the passing of each radioactive disc. The conduction of tube 1A closes the circuit going from the positive connection of battery 1E4, through the windings of control pulse relay CP, tube 1A, resistor 1R4, to ground, and from ground back to the negative connection of battery 1E4, causing control pulse relay CP to pick up, closing front contact 23. Similarly, when tube 2A conducts, it closes the circuit going from the positive connection of battery 2E4, through the windings of code relay C, tube 2A, resistor 2R4 to ground, and from ground back to the negative connection of battery 2E4, causing code relay C to pick up, opening back contacts 24 and 25 and closing front contacts 26 and 31.

Since the radioactive code discs 3 are positioned slightly ahead of their stepping control discs 2, code relay C will be picked up (assuming the presence of a code disc) just prior to the time control pulse relay CP picks up. Thus, each time a stepping control disc 2 passes beneath radioactivity detector 9, control pulse relay CP picks up closing front contact 23 and completing the transmission circuit going from the positive side of battery E5, front contact 23, either back contact 24 and transmission line 32 or front contact 26 and transmission line 33, the windings of control relay CR (see FIG. 9B), and back through either transmission line 33 and back contact 25 or transmission line 32 and front contact 31 to the negative side of battery E5.

It is apparent that the direction of current in the transmission lines 32 and 33 and through the windings of control relay CR is dependent upon code relay C. Whenever a radioactive code disc 3 passes beneath radioactivity detector 10, code relay C picks up closing front contact 31 and allowing current flow from the (−) side of battery E5 through transmission line 32 when front contact 23 is closed. This current flow shall be referred to hereinafter as having (−) polarity. Contrarily, when the code pattern is such that there is no radioactive code disc 3 corresponding to a radioactive stepping control disc 2, code relay C is not energized, back contact 24 remains closed and current flows from the (+) side of battery E5 through transmission line 32 when front contact 23 is closed. Current flow in this direction shall be referred to hereinafter as having (+) polarity.

Thus, with each passage of a bus beneath a reporting point, control pulse relay CP picks up eight consecutive times sending, through transmission lines 32 and 33 and control relay CR, eight pulses of coded current, the polarity of which is determined by the presence or absence of radioactive code discs according to the binary code pattern which has been cranked onto the movable tapes 5 of the bus top unit 8.

It should be noted at this point that the control and code pulses are induced in the detector circuits at a rate varying with, and directly proportional to, the speed of the bus as it passes beneath the detectors. And further, since these pulses determine the operation of control pulse relay CP and code relay C, which, in turn, determine the frequency and polarity of the signals transmitted to the central office, it is apparent that the coded information is also transmitted at a rate varying with, and directly proportional to, the speed of the bus as it passes beneath the detectors.

In FIGURE 9B, control relay CR is a polar relay whose armature schematically moves to the right when the transmission current has (+) polarity (indicating "no-disc" in the code pattern) and to the left when the transmission current has (−) polarity (indicating "disc" in the code pattern).

Each time control relay CR is actuated by a pulse of current of either polarity in the transmission circuit, a circuit is closed leading from (+), contact 34 or 35, and through the windings of stepping control relay SC to (−), causing stepping control relay SC to pick up, closing front contact 36. This closes the circuit from (+), front contact 36, and through the windings of execution control relay ER1 to (−), which picks up execution control relay ER1, closing front contact 37. In a similar fashion, closing of front contact 37 causes the pick up of execution control relay ER2, closing front contact 38, which likewise picks up execution control relay ER3, closing front contact 39 and picking up execution control relay ER4. Each of the execution control relays is designed for fast pick up but slow drop away, the characteristics being such that execution control relay ER1 will not drop away during the normally consecutive picking up and dropping away of stepping control relay SC when the latter is actuated by pulses resulting from passage of a bus beneath the reporting point. The execution control relays ER1 through ER4 are thus maintained in their picked up positions from the time the first disc of a given bus passes under the reporting point until some time after the bus has completed its passage beneath the reporting point.

When stepping control relay SC initially picks up in response to the pulse created by the first stepping control disc, a circuit is closed from (+), front contacts 40 and 41, back contacts 43, 44, 45, 46, 47, 48 and 49, and through the lower windings of half step polar HS to (−), causing the armature of relay HS to go to the left, closing contacts 50. When stepping control relay SC drops away between the first and second stepping control pulses, a new circuit is completed from (+), front contact 40, back contact 42, contact 50, back contacts 52, 53 and 54, and through the windings of stepping relay S1 to (−), causing stepping relays S1 to pick up and stay up due to the closing of the stick circuit from (+), front contacts 55 and 56 through the windings of stepping relay S1, to (−).

When stepping control relay SC picks up again in response to the next control pulse, a circuit is closed from (+), front contacts 40 and 41, back contacts 43, 44, 45, 46, 47 and 48, front contact 57, through the upper windings of half step polar relay HS to (−), throwing the armature of relay HS to the right and closing contact 51. When stepping control relay SC next drops away, a circuit is then completed from (+), front contact 40, back contact 42, contact 51, back contacts 57, 58 and 59, front contact 60 and through the windings of stepping relay S2 to (−), causing stepping relay S2 to pick up and stay up due to the closing of the stick circuit from (+), front contacts 55 and 61, and the windings of stepping relay S2, to (−).

Stepping relays S3, S4, S5, S6 and S7 are similarly picked up and stuck up successively upon the successive actuations of control relay CR in response to the pulses created as each bus top stepping control disc 2 passes the reporting point. It should be noted that each successive stepping relay is picked up when stepping control relays SC drops away, that is, stepping takes place between each successive control pulse.

When control relay CR is initially actuated by the first of each group of coded pulses, a circuit is closed from either (B+) at contact 62 or (B−) at contact 63 (according to the polarity of the transmission line current), front contact 64, back contact 65, 66, 67, 68, 69, 70 and 71, and the windings of code storage relay US1 to (CN), sticking code storage relay US1 up or down depending upon the polarity of the actuating current. The code storage relays are of the polar mag-stick type, well-known in the art, and schematically their armatures (see FIG. 9C) are stuck up by current of positive polarity, and stuck down by current of negative polarity.

Upon the second successive actuation of control relay CR, stepping control relay SC having dropped away and stepping relay S1 having picked up between the actuating pulses, a circuit is again completed from (B+) at contact 62 or (B−) at contact 63, front contact 64, back contacts 65, 66, 67, 68, 69 and 70, front contact 72 and the windings of code storage relay US2 to (CN), sticking code storage relay US2 either up or down according to the polarity of the actuating current. Stepping control relay SC then drops away, causing stepping relay S2 to pick up, and so on, until code storage relays US3, US4, TS1, TS2, TS3 and TS4 have been similarly stuck up or down in accordance with the polarity of their actuating currents. Following each passage of a bus by the reporting point, the code storage relays are thus stuck up and down in a pattern conforming to the pattern of the bus top code discs 3, "up" corresponding to the presence of a "disc" and "down" corresponding to "no-disc."

It can now be seen that the stepping relays have been successively picked up between each successive pulse of current in the transmission line. Since the latter vary with the speed of the bus as it passes beneath the reporting point, the stepping relays also step at the same relative rate. And further, since the circuits to the code storage relays are successively closed by the successive operation of the stepping relays, the code patterns stored on the storage relays will always conform to the bus top code pattern regardless of the variations in the rate of transmission. FIGURE 9C is a schematic representation of that part of the central office unit which converts the stored code pattern into visually perceptible panel indications and permanent printed records. This section of the circuit is best understood by first considering the design of the basic elements of the vehicle identification panel indicators (shown in FIGURE 1) and recorder printing units.

Each indicator or printing unit consists, in part, of two identical wheels 73 the peripheries of which, as indicated in FIGURE 12A, are fitted out with numerals for visual indications or numerical type for printing. One wheel of each indicator or printing unit is positioned to indicate the "tens" digit in the bus number and the other to indicate the "units" digit.

As shown in FIG. 12, each of these wheels 73 is coupled by means of a shaft 74 to four specially designed cams 75, 76, 77 and 78, and to an electric motor M, suitable for rotating the shaft, all generally as disclosed in Shaft Positioning Control System, Pat. No. 2,476,673, issued July 19, 1949 to R. W. May et al. Current from a (+) source fed to input wires 17, 18, 19 and/or 20, passes through front contacts 80, 81, 82 and/or 83, and through the windings of indicator relay IR to (−), closing front contact 79 which energizes the shaft rotating motor M. The shaft continues to rotate until the operation of the various cams 75, 76, 77 and/or 78 is such that they open contacts 80, 81, 82 and/or 83 cutting off current to relay IR which drops away, stopping the motor M and locking the shaft 74 at that particular angle of rotation.

FIG. 12 shows the position of the indicator wheel shaft after the closing of a circuit through input wire 17 only. It may be assumed that shaft 74 rotated until the "0" lobe of cam 75 opened the circuit at contact 80, stopping the shaft rotation at that point, the indicator wheel registering "0" as shown in FIG. 12A. Likewise, due to the design of cams 75, 76, 77 and 78, the shaft will rotate and stop at ten different selective positions in accordance with the closing of circuits to (+) through input wires 17, 18, 19 and/or 20 as set forth in the following table, wherein the symbol "+" represents the closing of the circuits to the appropriate input wires:

| Input Wire | Shaft Position | | | | | | | | | |
|---|---|---|---|---|---|---|---|---|---|---|
| | 1 | 2 | 3 | 4 | 5 | 6 | 7 | 8 | 9 | 0 |
| 17 | ---- | ---- | ---- | + | -' | + | ---- | ---- | ---- | + |
| 18 | ---- | + | + | ---- | ---- | + | ---- | ---- | + | ---- |
| 19 | + | ---- | + | ---- | + | ---- | ---- | + | ---- | ---- |
| 20 | + | + | ---- | + | ---- | ---- | + | ---- | ---- | ---- |

Thus, when (+) is fed into input wires 19 and 20, the shaft 74 will rotate until the numeral "1" appears at the indicator window or is positioned for printing; when (+) is fed into input wires 18 and 20, shaft 74 rotates until "2" appears; when (+) is fed into input wires 18 and 19, shaft 74 rotates until "3" appears; etc.

The positioning of the indicator wheel and printing wheel elements is accomplished by means of the selective energization of the input wires to each element, as just described above, and, returning now to FIG. 9C, this selective energization is determined by the relative positions of the "units" indication control relays, U1 through U4, and the "tens" indication control relays, T1 through T4. The Code Conversion Table (FIGS. 11 and 11A) shows the combinations of these indication control relays which result in the ten selective energizations (set forth in the above table) for each digit position of the wheel elements. As described above, the code storage relays are stuck up or down in patterns dependent upon the presence or absence of code discs on a passing bus, and the Code Conversion Table also shows the patterns stored on the code storage relays corresponding to each digit of the binary tape code.

The transfer or conversion from these code storage relay patterns for each digit to the corresponding indication control relay pattern for the same digit is accomplished by means of two identical sets of simplified tree circuits (one set for "units" information and the other for "tens" information) controlled by the armatures of the code storage relays. These tree circuits have been worked out to cooridnate the relay patterns shown in the Code Conversion Table. For any given tape-code-digit information stored on the code storage relays, circuits are completed from execution control line 100, through the tree circuits, to the appropriate indication control relays, energizing them in the pattern corresponding to the same digit.

Thus, when a (+) potential is fed into execution control line 100, circuits are completed through the tree circuits and their respective output wires 84, 85, 86 or 87 and 94, 95, 96 or 97, and through the windings of the appropriate indication control relays, U1 through U4 and T1 through T4, to (−), causing these relays to pick up, and closing circuits from execution control line 101, through contact banks 88, 89, 90 and 91 to selected indicator input lines 17, 18, 19 or 20 and 27, 28, 29 or 30, and recording unit input lines 107, 108, 109 or 110 and 117, 118, 119 or 120, providing for the indication and recording of digits conforming to the coded bus number information previously stored on the code storage relays.

The operations of code conversion and of positioning the indicator and printing wheels, as generally described above, are sequentially controlled by the aforementioned execution control relays ER1 through ER4 (shown in FIG. 9B). After a bus has completely passed the reporting point, the detection circuit is no longer excited by pulses of current, and control pulse relay CP remains dropped-away, leaving the transmission line circuit open which in turn allows the armature of control relay CR to remain in neutral position. Thus, the circuit including the windings of stepping control relay SC remains open, causing it to remain in a dropped-away position and leaving front contact 36 open.

After a time delay determined by its slow drop-away characteristics, execution control relay ER1 drops away, opening front contact 37 which cuts off the energy to execution control relay ER2, and, at the same time, closing back contact 92 which completes the circuit from (+), back contact 92, front contact 93, execution control line 100, the various tree circuits and their respective output wires 84, 85, 86 or 87 and 94, 95, 96 or 97, through the windings of the selected indication control relays U and T, to (−), causing the selected U and T relays to pick up. (It should be noted that these latter relays will remain picked up until such time as the energy to their windings is cut off by the dropping away of execution control relay ER3 and the resulting opening of front contact 93.)

After another time delay, execution control relay ER2 drops away opening front contact 38 and cutting off the current to relay ER3, and, at the same time, closing back contact 98. This closes a circuit from (+), back contact 98, front contact 99, execution control line 101, through the selected contacts of contact banks 88, 89, 90 and 91, to indicator input lines 17, 18, 19 or 20 and 27, 28, 29 or 30, and recording unit input lines 107, 108, 109 or 110 and 117, 118, 119 or 120, causing the indicator and printing wheels to be positioned as explained above. Also, the dropping away of relay ER2 opens front contact 103 which opens the stick circuits for all of the stepping relays S1 and through S7, which drop away and are thus reset for stepping off the coded information detected when the next bus passes the reporting point.

After a third time delay, execution control relay ER3 drops away, opening front contacts 39, 93 and 99, thus cutting off current to relay ER4 and opening the circuits connected through execution control lines 100 and 101, and, at the same time, closing back contact 104 which completes a circuit from (+), back contact 104, front contact 105, execution control lines 102, through the windings of printing relay PR, to (—). The energization of relay PR causes the printing of the information collected on the printing wheels of the recorder.

The recorder, schematically represented in FIG. 13, consists generally of a date and time printer 106 positioned by a clock mechanism, a bus number printer 111 positioned as set forth above, rolled paper tape 112, and printing relay PR. Since the particular form of the recorder is not a part of the present invention, a detailed description of its operation is not considered necessary, and it should suffice to state that the recorder may be a modification of any of the well-known types of time controlled printing devices, which, when energized, stamp the date and time on paper tape, the paper tape being rolled ahead following each energization. This latter operation is shown, for purposes of this disclosure, to be accomplished by the simple means of a ratchet wheel 113 rigidly fixed to wind-up drum 114, and a pawl 123 and spring 115 attached to an arm 121 rigidly fixed to the armature 122 of printing relay PR. When relay PR drops away, following each printing, the arm 121 is pulled down by spring 115 causing the pawl 123 to engage the teeth of the ratchet wheel 113 and to rotate the wind-up drum 114 enough to move the roller paper tape 112 ahead one space.

Thus, with the passing of a bus by a given reporting point, the designated number of the bus appears at the indicator window for that reporting point located on a panel in the central traffic control office (see FIG. 1), and at the same time a printed record is made by the recorder for that reporting point as shown in FIG. 14.

*Operation*

For purposes of fuller explanation, it is now intended to give a more detailed description of some of the above discussed operations by following the identification of a particular bus which, it will be assumed, has been assigned the bus number "70."

Prior to starting out on his assigned route, the bus driver first cranks the number "70" into the window 15 in the front of his bus, thereby correspondingly positioning the movable tapes 5 so that the code pattern for the "unit" digit "0" appears in the front window of the bus top unit, and the code pattern for the "tens" digit "7" appears at the rear window. These patterns correspond to those shown in FIGS. 5 and 6, the front or "unit" tape pattern being "disc-no disc-disc-no disc," and the rear or "tens" tape pattern being "no disc-no disc-disc-disc."

As the bus passes under a reporting point as shown in FIG. 2, the influencing elements used for control purposes 2 create a series of eight consecutive pulses of current in detector 9, and similarly each code element 3 creates a pulse of current in detector 10. These current pulses are amplified as hereinbefore described and energize the control pulse relay CP and code relay C.

With the passage of the bus, control pulse relay CP picks up eight consecutive times, creating eight pulses of current in the transmission circuit, the polarity of the pulses depending upon whether or not code relay C has picked up. During the passage of bus "70," code relay C picks up only four times, namely, an instant before the first, third, seventh, and eighth control pulses. Therefore, the polarity of the transmission line current during the eight successive pulses changes in the following pattern: —+—+++——.

Each pulse of current communicated through the transmission line energizes control relay CR which moves to the left when the transmission current polarity is (—) and to the right when it is (+). As explained above, stepping relays S1 through S7 are consecutively picked up after each consecutive pulse of current in the transmission line, and with each consecutive movement of control relay CR to the left or right, circuits are closed consecutively to the code storage relays, US1 through US4 receiving the first four pulses of "units" information and TS1 through TS4 receiving the last four pulses of "tens" information. The polarity of the current through those consecutively closed circuits is dependent upon the polarity of the transmission line current through control relay CR. When CR goes to the left, placing (B+) on the input winding of a code storage relay, it sticks up, and when control relay CR moves to the right, placing (B—) on the input to the winding of a code storage relay, it sticks down. Therefore, following the pattern of the transmission-line-current polarity (—+—+++——) which accompanies the passage of bus "70," code storage relays US1 through US4 are successively and respectively stuck up and down in the pattern "up-down-up-down" while code storage relays TS1 through TS4 are successively and respectively stuck in the pattern "down-down-up-up."

After the bus has completely passed the reporting point, execution control relay ER1 drops away closing the circuit from (+), back contact 92, and front contact 93 to execution control line 100 which is the input to all of the tree circuits operated by the code storage relays. Looking only at the tree circuits operated by code storage relays US1 through US4, which are now storing "units" information and are stuck in the pattern "up-down-up-down": front contact 124 is closed and front contact 125 is opened, leaving open the circuit between line 100 and line 84, and, thus, leaving "units" indication control relay U1 dropped away; front contact 126, and back contacts 127 and 128 are all closed completing the circuit to line 85 and picking up relay U2; front contact 129 and back contacts 130 and 131 are all closed energizing relay U3; and front contact 132, back contact 133 and front contact 134 are closed allowing relay U4 to pick up. Thus, upon energization of execution control line 100, the selective closing of the various tree circuits in accordance with the stored code pattern causes the "units" indication control relays U1 through U4 to be positioned in the relative pattern; "down-up-up-up" which conforms to the requirements of the Code Conversion Table shown in FIGS. 11 and 11A for the digit "0."

Similarly, looking now at the tree circuits controlled by code storage relays TS1 through TS4 which are storing the "tens" information and are stuck in the pattern "down-down-up-up": back contact 135 and front contact 136 are closed to line 94, picking up relay T1; back contact 137 and front contact 138 are closed to line 95, energizing relay T2; back contacts 139 and 140 and front contact 141 are closed to line 96, picking up T3; but, since back contacts 142 and 143 are closed and front contact 141 are closed to line 96, picking up T3; but, open and T4 remains in its dropped away position. Thus, the closing of these circuits energizes the "tens" indication relays T1 through T4 in the pattern "up-up-up-down" in conformance with the requirements of the Code Conversion Table in FIGS. 11 and 11A for the digit "7."

When execution control relay ER2 drops away closing the circuit from (+), back contact 98 and front contact 99 to execution control line 101, circuits are closed only through back contacts 145 and 153 to indicator input line 17 and to recording input line 107, back contacts 146, 147 and 148, and 154, 155 and 156, being held open by the "units" indication relay pattern of "down-up-up-up." The closing of a circuit to (+) through lines 17 and 107 (line 107 corresponding to line 17 as shown in FIG. 12) will position the "units" indicator and printing wheels to "0" as shown in the above table and explained in connection therewith.

At the same time a circuit is also closed from execution control line 101 through back contacts 152 and 160 (back contacts 149, 150 and 151, and 157, 158 and 159 being held open by the "tens" indication relay pattern of "up-up-up-down") to lines 30 and 120 each of which corresponds to line 20 in FIG. 12. This input, as set forth in the above table and explained in connection therewith, positions the "tens" indicator and printing wheels to "7."

Thereafter, execution relays ER3 and ER4 consecutively drop away energizing the printing circuit and finally restoring the entire circuit to its pre-signal state to wait further energization by the next passage of a bus by the field check point.

Having described one specific embodiment of the present invention, it is desired that it be understood that this form has been selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a system for communicating the distinct identity of each of a plurality of vehicles moving past a reporting location, an electrical circuit capable of being operated to produce an output pulse of a selected characteristic, detecting means mounted adjacent said reporting location and electrically connected to said circuit operative to be activated to operate said electrical circuit and select the characteristic of the output pulse, a first activating means mounted on each of said vehicles disposed to activate said detecting means successively a fixed number of times as each vehicle passes the reporting location to cause said electrical circuit to produce a fixed number of output pulses, a second activating means being arranged in a distinctive manner in accordance with the particular identity of the vehicle to activate the detecting means selectively to cause said fixed number of output pulses to be in a respective combination of characteristics, and registering means connected to said electrical circuit to register the particular identity of a respective vehicle upon the reception of said fixed number of pulses in a distinct combination of characteristics.

2. In a system for transmitting coded identification information from a vehicle moving past a reporting location, an electrical circuit operative to be activated for producing an output pulse of a selected polarity, a first plurality of elements on said vehicle operative to activate said circuit successively a fixed number of times to produce a fixed number of output pulses in succession as said vehicle passes said location, and a second plurality of elements on said vehicle operative to select the polarity of said output pulses according to a distinct code corresponding to the identity of the vehicle.

3. In a system for communicating the distinct identity of each of a plurality of vehicles moving past a reporting location, an electrical circuit capable of being operated to produce an output pulse of a selected polarity, detecting means mounted adjacent said location and electrically connected operatively to said circuit to cause said electrical circuit to produce an output pulse of a selected polarity, a first activating means mounted on said vehicle and arranged to activate said detecting means a fixed number of times each time a vehicle passes said location to cause said circuit to produce a fixed number of output pulses, a second activating means on said vehicle positioned in accordance with the identity of the vehicle to cause said detecting means to select the polarity of each of said fixed number of output pulses, and registering means connected to the electrical circuit responsive to the fixed number of output pulses in a distinctive combination of polarities to register the identity of a respective vehicle.

4. In a system for communicating the identity of a vehicle moving past a reporting location, an electrical circuit capable of being operated to produce an output pulse of a selected characteristic, a first detecting means mounted adjacent said location and electrically connected operatively to said circuit to cause said circuit to produce an output pulse each time said first detecting means is activated, a second detecting means mounted adjacent said first detecting means electrically connected to said circuit operative to select the characteristic of each output pulse, a first activating means mounted on said vehicle and arranged to activate said first detecting means a fixed number of times each time a vehicle passes said location to cause said circuit to produce a fixed number of output pulses, a second activating means on said vehicle positioned to activate said second detecting means selectively in accordance with the identity of the vehicle to select the characteristic of each output pulse, and registering means responsive to the fixed number of pulses in a distinctive combination of characteristics to register the identity of a respective vehicle.

5. In a system for communicating the identity of a vehicle moving past a reporting location, an electrical circuit capable of being operated normally to produce an output pulse of one characteristic, means connected electrically to said circuit effective when operated to condition said circuit to produce an output pulse of another characteristic upon the operation of said circuit, a first detecting means mounted adjacent said location and connected electrically to said circuit to operate said circuit, a second detecting means mounted adjacent said location and connected electrically to said circuit to operate said conditioning means, a first plurality of activating means on said vehicle positioned to activate said detecting means a fixed number of times to cause said circuit to produce a fixed number of output pulses when each vehicle passes said reporting location, a second activating means positioned on said vehicle to activate said second detecting means variably in accordance with the particular identity of the vehicle to operate said conditioning means, whereby said fixed number of output pulses are in a respective combination of one and the other characteristics in accordance with the identity of the vehicle, and means responsive to said fixed number of output pulses in a respective combination of one and the other characteristics to register the identity of the respective vehicle.

6. A system for communicating the identity of each of a plurality of vehicles moving in one lane at a reporting location along a plural lane highway, an electrical circuit normally capable when operated of producing an output pulse of one characteristic, conditioning means electrically connected operatively to said circuit effective when activated to cause said circuit when operated to produce an output pulse of another characteristic, a first detecting means positioned adjacent said lane and connected electrically to said conditioning means effective when activated to activate said conditioning means, a second detecting means spaced from said first detecting means connected electrically to said circuit effective when activated to operate said circuit, a fixed number of spaced activating elements mounted on each of said vehicles and positioned operatively to activate said second detecting means a fixed number of times as each vehicle passes the reporting location in said one lane, identification activating means mounted on said vehicle and positioned selectively adjacent certain of the activating elements to activate said first detecting means prior to the activation of said second detecting means as caused by its associated activating element, thereby causing the electrical circuit to produce a fixed number of output pulses in a combination of characteristics in accordance with the identity of a respective vehicle, and receiving means responsive to said fixed number of pulses in a distinct combination of characteristics to identify a respective vehicle.

7. A system as claimed in claim 6 wherein said fixed number of activating elements are spaced from each other in a direction parallel to the travel of the vehicle.

8. A system as claimed in claim 6 wherein said identification activating means are spaced irregularly from each other parallel to the direction of travel of the vehicle, and means are provided on the vehicle to selectively position certain ones of said elements adjacent respective ones of said activating elements in accordance with the selected identification of the vehicle.

9. A system as claimed in claim 8 wherein said activating elements and said identification activating means are positioned operatively atop of each vehicle, and said first and second detecting means are positioned to be spaced above the identification activating means and said activating elements to activate its respective detecting means successively as said vehicle moves through said one lane.

10. In a system for communicating the identity of each of a plurality of vehicles moving past a reporting location in one lane of a plural lane highway, a circuit means effective to be operated distinctively to produce a plurality of successive output pulses of selected characteristics, registering means connected electrically to the output of said circuit means responsive to a plurality of said output pulses in succession in a respective combination of selected characteristics to register the identity of a respective vehicle, a first means including a portion at said reporting location and a portion on each of said vehicles to govern said circuit means to produce a plurality of output pulses in succession each time a vehicle moves past said reporting location in said one lane, pulse characteristic selecting means affixedly mounted at said reporting location operative when activated to select the distinct character of the next succeeding output pulse, a plurality of activating means mounted on each of said vehicles positioned in substantially identically spaced relationship each operative to activate said pulse characteristic selecting means when passing in operative relationship thereto, and adjustable means on each of said vehicles operable to selectively position certain ones of said activating means relative to the vehicle portion of said first means according to a predetermined distinct vehicle identification whereby certain ones of the activating means are positioned in operative relationship to the pulse characteristic selecting means as the vehicle passes the reporting location.

11. In a system as claimed in claim 10 wherein the portion of the first means and the reporting location is a detector affixedly mounted adjacent said lane and the vehicle portion of the first means is a fixed plurality of spaced activating elements mounted on each vehicle positioned in the direction of travel of the vehicle to activate the detector a fixed number of times.

12. In a system as claimed in claim 11 wherein said activating means are mounted spaced from each other on each vehicle substantially parallel to the direction of travel of said vehicle, and the adjustable means is operable to adjustably position said activating means longitudinally of the direction of travel of each vehicle.

13. In a system as claimed in claim 12 wherein said pulse selecting means is positioned above said one lane, and said activating means are positioned to be in an operative position relative to the pulse characteristic selecting means on top of each vehicle.

14. In a system for communicating the identity of a vehicle moving past a reporting location, an electrical circuit means to produce an output pulse upon each operation thereof and capable of being conditioned prior to each operation to select the characteristic of each output pulse, first detecting means mounted adjacent said location and connected electrically to said circuit means to operate said circuit means upon each activation thereof, a second detecting means mounted adjacent said location and connected electrically to said circuit means to be effective when activated to condition said circuit means to select the characteristic of that output pulse occurring in response to the next operation of the circuit means, a first activating means mounted on said vehicle positioned to activate said first detecting means a predetermined number of times as the vehicle passes the reporting location, and a second activating means mounted on said vehicle in a position to activate said second detecting means selectively prior to each activation of the first detecting means in accordance with the identity of the vehicle.

References Cited by the Examiner

UNITED STATES PATENTS

| | | | |
|---|---|---|---|
| 1,983,342 | 12/1934 | Chambers | 104—88 |
| 2,194,057 | 3/1940 | Simpson | 104—88 X |
| 2,581,552 | 1/1952 | O'Hagan | 340—23 X |
| 2,600,817 | 6/1952 | Victoreen | 235—61.11 |
| 2,620,435 | 12/1952 | Vogt | 246—29 |
| 2,628,572 | 2/1953 | Goff | 246—63 |
| 2,719,284 | 9/1955 | Roberts | 340—182 X |
| 2,877,718 | 3/1959 | Mittag | 104—88 |

FOREIGN PATENTS

| | | |
|---|---|---|
| 798,538 | 7/1958 | Great Britain. |
| 800,190 | 8/1958 | Great Britain. |

MALCOLM A. MORRISON, *Primary Examiner.*

IRVING L. SRAGOW, ELI J. SAX, BENNETT G. MILLER, NEIL C. READ, *Examiners.*